Patented Mar. 4, 1947

2,416,700

UNITED STATES PATENT OFFICE 2,416,700

REFRACTORY CONCRETE

Daniel W. Kocher, Chicago, Ill., assignor, by mesne assignments, to Universal Atlas Cement Company, Indianapolis, Ind., a corporation of Indiana No Drawing. Application August 26, 1944, Serial No. 551,447

15 Claims. (Cl. 106—64)

This invention relates to an improved refractory, more particularly a refractory concrete of which an essential component is calcium aluminate cement.

One of the objects of the invention is the improvement in strength of refractory materials of the type described at elevated temperatures.

Another object is the improvement in the load bearing characteristics of such refractory when heated on all sides at elevated temperatures.

A further object is the improvement in abrasion resisting qualities of the refractory at elevated temperatures. The refractory made in accordance with the present invention also possesses a higher pyrometric cone equivalent than prior art refractories of the type indicated.

These and further objects of the invention will further appear as the description of the invention proceeds.

Refractory materials or concretes composed of calcium aluminate cement and various refractory aggregates have been employed successfully in applications where they are subjected to high temperatures. Such applications include roofs, sidewalls, and hearths of various types of furnaces, coke oven door linings, annealing furnace and tunnel kiln car tops. Calcium aluminate cement when mixed with water, forms certain hydrated compounds. When heated, these hydrated compounds lose appreciable portions of the combined water, which results in reduced strength. This loss of combined water increases with increase in temperature until at some temperature above 1600° F. all combined water is driven off and no hydraulic strength is present. When calcium aluminate cement is used as a binder for refractory aggregates, the resulting concrete likewise loses strength upon heating. However, at temperatures in the vicinity of 1600° F. some of the low melting compounds in the cement combine with the aggregate to form a ceramic bond resulting in increased strength. This ceramic strength increases with increase in temperature until the softening point of the concrete mixture is reached.

In refractory materials of appreciable thickness, which employ calcium aluminate cement as the binder, wherein one face is subjected to temperatures on the order of 2000° F. the outer face of the material may never be heated above temperatures in the order of 500° F. Intermediate portions of the refractory will be subjected to temperatures depending upon their distances from the hotter face. It has been found that whereas the hot zone of the refractory, which has been subjected to temperatures in the order of 2000° F., possesses adequate strength, due to the development of a good ceramic bond, and the cold zone has good strength, since the cement in such zone still possesses a considerable portion of its hydraulic strength, due to the relatively low temperature to which it is subjected, an intermediate zone of the refractory is weaker than either the hot or cold zones due to the marked impairment in the hydraulic strength without the development of any substantial ceramic strength.

The use of a mix in accordance with the present invention for making refractory materials of the type described decreases the intermediate weak zone area to such a degree that it is eliminated when a panel 4½" thick is subjected to a temperature of 2200° F. on one face for eight hours, and is materially decreased in wall sections of greater thickness when subjected to higher temperatures or for a greater length of time.

The present invention consists in the addition of topaz, either raw or partly calcined, to calcium aluminate cement in the formation of refractory material. Refractory material within the scope of the present invention may consist of topaz and calcium aluminate cement, or it may consist of these materials plus other refractory materials which may be in the form of aggregates.

The refractory concrete of the present invention is made from a mix the constituents of which lie within the following limits of per cent by weight of the total weight of the mix:

| | Per cent |
|---|---|
| Topaz, raw or partly calcined | .5–95 |
| Calcium aluminate cement | 5–60 |
| E. g. (refractory filler) refractory aggregate | 0–94.5 |

The calcium aluminate cement is one whose major constituents are calcium aluminates, and is sometimes referred to as high alumina cement, aluminous cement, or fused cement. A typical calcium aluminate cement falling within the above definition is one having the following composition, the constituents being given by per cent weight of the cement:

| | Per cent |
|---|---|
| $Al_2O_3$ | 45 |
| CaO | 36 |
| FeO and $Fe_2O_3$ | 13 |
| $SiO_2$ | 5 |
| MgO | 1 |

It is to be understood that the specific cement given above is by way of example only, and that calcium aluminate cements within the broad definition may be employed in the present invention.

By "partly calcined topaz" as used above is meant a topaz which has been heated in such manner that at least 1% by weight fluorine remains in the topaz.

The constituents of the mix are supplied thereto in either comminuted or granular form to allow them to be uniformly distributed throughout the mix and consequently the resulting concrete. Those constituents which form the bond are preferably finely ground to facilitate their reaction. The calcium aluminate cement, for example, may be of such fineness that practically all particles will pass through a one hundred mesh screen, and the topaz may be ground to any particle size. The refractory filler, which may be fire clay grog, crushed firebrick, expanded shale, olivine, fused alumina, chrome, magnesite, vermiculite, diatomaceous earth, and the like, or combinations of these materials depending upon the use to which the refractory concrete is to be put, may be of any desired particle size or range of particle sizes consistent with substantial uniformity of distribution throughout the resulting concrete. Naturally, also, in concrete of thinner section the aggregate particle size will be chosen smaller than in concrete of thick section. An aggregate useful in moderately thick sections is one having particles from 1½" in diameter to dust, 50% by volume passing through a ⅛" screen and 50% by volume being retained on a ⅛" screen, approximately 15% by volume of the total passing a one hundred mesh screen. For concrete of thinner sections the maximum permissible particle size will obviously be smaller.

The mix may conveniently be made by mixing the calcium aluminate cement and the topaz in dry condition to a uniform color, the refractory aggregate being thoroughly wet down with water and then added to the calcium aluminate and topaz mixture. Sufficient water is added to the resulting mixture to render it workable, the amount added depending upon the manner in which the mix is to be subsequently handled in the formation of the concrete shape or structure. Thus, if the concrete is to be cast into a mold or form, particularly if the shape is intricate, the mix should be of puddling consistency. For simple shapes, so cast, less water may be used, whereas if the mix is to be tamped or vibrated into place or molded under pressure, still less water may be used. It is obvious that sufficient water should be used in all cases to develop fully the hydraulic strength of the cement and that an excess of water should be avoided. Besides the variations in modes of handling the mix above indicated, it is possible to deposit it in a mold or form or in any desired location, as for instance, in the applying of patches to existing structures, by charging the mix into a cement gun which pumps or otherwise forces it out through a discharge orifice.

After the mixture has been shaped or molded in any one of the ways above described, it is dried and then heated. Usually for bodies of large section, such as cast furnace walls, the practice follows approximately that employed in the drying and heating of newly constructed firebrick linings. The concrete may be air dried for a period of several days, after which the furnace is heated at temperatures which gradually increase up to operating temperature.

Smaller bodies and shapes, such as cast bricks, tiles and slabs may be kept for a time, on the order of twenty-four hours in a high humidity-constant temperature atmosphere, dried at a low temperature, on the order of 230° F., and then subjected to a high temperature approximating that at which the shape will be used, for example, 2000° F.

Concrete resulting from mixes made in accordance with the present invention, after having been dried and heated as above, possesses increased strength, improved load bearing characteristics at elevated temperatures, lower porosity, greater abrasion resistance at elevated temperatures, and a higher pyrometric cone equivalent than similar concretes made from mixes containing no topaz. The increased strength and load bearing qualities of the concrete of the present invention at room temperatures are strikingly shown by the following table, which gives the compressive strengths of two inch cubes made of a base mixture of 22.70% by weight of calcium aluminate cement of the type indicated as being employed in the present invention and 77.30% by weight of crushed firebrick (a ratio of 1:4 by volume) with varying amounts of topaz added thereto. For purposes of conversion between compositions by weight and by volume, the weight per cubic foot of the material is as follows:

Calcium aluminate cement_____ 94
Topaz _____ 71
Crushed firebrick_____ 80

The mix was made of a puddling consistency and cast into two inch cube molds. After treatment in a moist cabinet, drying at 230° F., and firing for four days at 2000° F., the cubes were allowed to cool. After cooling each cube was subjected to a compressive strength test at room temperature by subjecting it to gradually increasing pressure until a point of failure of the cube was reached. The amount of topaz is given as a percentage by weight of the total mix.

*Compressive strength*

| Topaz | 0 | 4.12 | 7.92 | 11.38 | 14.52 |
| --- | --- | --- | --- | --- | --- |
| Average compressive strength, p. s. i. | 1,008 | 1,462 | 2,914 | 4,998 | 5,421 |

Such increased strengths at room temperatures in refractory products such as those tested would be expected by one skilled in the art to result in increased strengths at the temperature to which the refractory material is heated during use. Such expectation is fully borne out by results obtained from the performance of the materials during load tests at 2200° F. Such tests are the same as A. S. T. M. designation C16–34T, with the exception that they were carried out at a temperature of 2200° F.

*Load tests at 2200° F.*

| | Composition, per cent by weight of mix | | | Per cent subsidence |
| --- | --- | --- | --- | --- |
| | Calcium aluminate cement | Topaz | Aggregate | |
| I | 22.70 | 0 | 77.30 | 1.85 |
| II | 19.38 | 14.52 | 66.10 | 1.35 |
| III | 12.80 | 0 | 87.20 | 2.44 |
| IV | 11.73 | 8.84 | 79.70 | 1.10 |

Concretes made in accordance with the present invention further possess a higher pyrometric cone equivalent than similar concretes without topaz as evidenced by the results obtained from the following typical examples:

A mixture of 12.80% calcium aluminate cement and 87.20% crushed firebrick, by weight, and a mixture of 11.73% calcium aluminate cement, 8.84% finely ground topaz, and 79.7% crushed firebrick, by weight, were made, and pyrometric cones were made from each. After treating as above indicated to allow the cement to attain hydraulic strength, the cones were fired at increasing temperatures. The temperatures at which each cone went down were noted.

|  | No topaz | Topaz addition |
|---|---|---|
| Pyrometric cone equivalent. | Cone 20 (2768° F.) | Cone 26 (2903° F.) |

The refractory concrete made in accordance with the present invention and fired to temperatures of at least 1600° F., when examined under the petrographic microscope in thin section is found to have the bond composed of extremely minute crystals, so fine that it is impossible to establish their identity. Similar concretes without topaz, on the other hand, treated in the same manner, possess bonds composed substantially or wholly of relatively large, easily identifiable crystals of calcium aluminate.

The reason why refractory concretes employing topaz with calcium aluminate cement in accordance with the present invention yield such increased hot and cold strengths, abrasion resistance, and density as compared to similar concretes similarly treated but without topaz is not fully understood. It has been observed, however, that when concrete mixes containing topaz, whether raw or partly calcined, are heated to at least 1400° F., substantial amounts of fluorine are given off.

The reaction of topaz alone when subjected to heating at temperatures of such order or above is as follows:

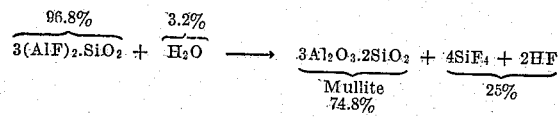

$$3(AlF)_2.SiO_2 + H_2O \longrightarrow 3Al_2O_3.2SiO_2 + 4SiF_4 + 2HF$$
$$96.8\% \quad 3.2\% \qquad \text{Mullite } 74.8\% \qquad 25\%$$

It has been theorized that when topaz is included in concretes of the type described, in accordance with the present invention, and the mixture heated to moderately high temperatures or above, the formation of mullite in fine crystalline form as a result of dissociation of the topaz produces the distinctive product obtained. Such theory, however, does not account for the following observed phenomenon.

Three bricks 9 inches long of compositions (1) 12.80% calcium aluminate cement and 87.20% crushed firebrick, by weight, (2) 12.20% calcium aluminate cement, 4.60% topaz, and 83.20% crushed firebrick, by weight, and (3) 11.73% calcium aluminate cement, 8.84% topaz, and 79.7% crushed firebrick, by weight, were placed side by side, in contact, in the order named, in the door of a furnace with one end flush with the inner surface of the furnace wall and heated to 2700° F. for five hours. Other bricks were employed to complete the closing of the door. At the end of that time the bricks were removed, allowed to cool, and sawed longitudinally. The fired ends of all three bricks were hard and dense, the ceramic bond in each having been highly developed by the high temperature. In the bricks numbered 2 and 3 the dense, strong, highly developed, ceramic bond extended back from the fired end a distance well over one-half the length of the bricks. This was evidenced by the type of surface obtained upon cutting the bricks longitudinally by an abrasive cut-off disc. In that portion of each brick wherein the ceramic bond was highly developed the cut surface was smooth and hard, whereas in that portion wherein the ceramic bond had not been highly developed the surface was rough and pitted, due to pulling out of the aggregate, and the bond was weak and crumbly.

In the brick numbered 1 above, in which no topaz was included, the hard smooth cut portion extended between the fired end and a line from a point almost half the length of the brick from the fired end on that side of the brick in contact with brick number 2 during heating, to a point on the opposite face of the brick about a quarter of the length of the brick from the fired end. The remainder of the brick was weak, soft, and the bond was easily scratched and crumbled, indicating loss of hydraulic strength with little if any development of ceramic or fired bond.

The reason for the observed result as to the increased strength of the above described portion of brick number 1 at the fired end thereof is not clear. It is known that the topaz in brick number 2, which was next to brick number 1, upon heating of brick number 2, breaks down to give $SiF_4$ and $HF$, and that at least some of both compounds escape from the brick as volatiles. It is thought that the fluorine or $HF$ diffusing into brick number 1 from brick number 2 may have catalyzed reactions in brick number 1, causing reactions to occur at lower temperatures than they would without such fluorine or $HF$, or causing reactions which would never occur without either or both. Again, it may be that the $SiF_4$ released reacts with oxygen to produce colloidal silica which is deposited in the interstices of the brick, thereby producing the dense, hard, strong, extremely fine crystal sized material observed. It is believed that the water of hydration driven off from the cement upon firing of the bricks may also play a part as a catalyst, either alone or in combination with the products of topaz, to produce the improved bond.

In any event, it is possible to produce the improved refractory concrete of the present invention by heating the concrete resulting from mixtures of calcium aluminate cement and refractory aggregate, but without topaz, in an atmosphere containing the volatile materials produced upon the heating of topaz to elevated temperatures. One way in which this may be done, in practice, with smaller shapes such as bricks, slabs, and tiles is to heat such shapes in a muffle furnace with a quantity of topaz in a crucible likewise placed in the muffle. In such case improvement of the bond results as a result of diffusion of the volatile materials given off by the topaz into the shapes. In the case of larger shapes, such as furnace walls or other parts cast or shaped in situ, the furnace or other part may be heated preparatory to being placed in service, by its own or by an auxiliary heating means, and an atmosphere of the volatile products of topaz upon heating thereof provided in contact with the shapes, as by placing topaz in proximity to the shape during the heating. Any appreciable amount of topaz, in such improvement of large or small shapes by diffusion, from a small fraction of one per cent of the total mass of the shape upwards results in improvement of the strength of shape. The improvement in refractory concrete employing calcium aluminate cement may also be attained, after the concrete has been in service, by the diffusion into it at elevated temperature of the volatile products given off by topaz when heated to 1400° F. or above.

Whereas particular embodiments of the invention have been described above for purposes of illustration, it will be evident that numerous variations of details are possible within the teaching of the invention. I desire to claim as new the following:

1. A mix for forming refractory concrete comprising calcium aluminate cement from 5 to 60% by weight of the mix and topaz containing at least 1% by weight of fluorine from .5 to 95% by weight of the mix.

2. A mix for forming refractory concrete comprising calcium aluminate cement from 5 to 60% by weight of the mix, topaz containing at least 1% by weight of fluorine from .5 to 95% by weight of the mix, and refractory aggregate up to 94.5% by weight of the mix.

3. A mix for forming refractory concrete comprising from 5 to 60% by weight of the mix of a cement composed essentially of calcium aluminates and topaz containing at least 1% by weight of fluorine from .5 to 95% by weight of the mix.

4. A refractory concrete formed from a mix comprising calcium aluminate cement from 5 to 60% by weight of the mix and topaz containing at least 1% by weight of fluorine from .5 to 95% by weight of the mix.

5. A refractory concrete formed from a mix comprising calcium aluminate cement from 5 to 60% by weight of the mix, topaz containing at least 1% by weight of fluorine from .5 to 95% by weight of the mix, and refractory aggregate up to 94.5% by weight of the mix.

6. A refractory concrete formed from a mix comprising from 5 to 60% by weight of the mix of a cement composed essentially of calcium aluminates, topaz containing at least 1% by weight of fluorine from .5 to 95% by weight of the mix, and refractory aggregate up to 94.5% by weight of the mix.

7. A refractory concrete body formed from a mix comprising calcium aluminate cement from 5 to 60% by weight of the mix and topaz containing at least 1% by weight of fluorine from .5 to 95% by weight of the mix, at least one portion of said body having been subjected to a temperature of at least 1600° F. for a sufficient length of time so that the reaction of the topaz will compensate for the loss in hydraulic strength.

8. A refractory concrete body formed from a mix comprising calcium aluminate cement from 5 to 60% by weight of the mix, topaz containing at least 1% by weight of fluorine from .5 to 95% by weight of the mix, and refractory aggregate up to 94.5% by weight of the mix, at least one portion of said body having been subjected to a temperature of at least 1600° F. for such a length of time that the reaction of the topaz will compensate for the loss in hydraulic strength.

9. A refractory concrete body formed from a mix comprising from 5 to 60% by weight of the mix of a cement composed of from 70 to 80% by weight calcium aluminate, topaz containing at least 1% by weight fluorine from .5 to 95% by weight of the mix, and refractory aggregate up to 94.5% by weight of the mix, at least one portion of the body having been subjected to a temperature of at least 1600° F. for such a length of time that the reaction of the topaz will compensate for the loss in hydraulic strength.

10. A refractory concrete body formed from a mix comprising calcium aluminate cement from 5 to 60% by weight of the mix, topaz containing at least 1% by weight of fluorine from .5 to 95% by weight of the mix, and refractory aggregate up to 94.5% by weight of the mix, at least one portion of said body having been subjected to a temperature of at least 2000° F. for such a time that the hydraulic strength of said fired portion has been substantially destroyed, said fired portion of the body consisting of refractory aggregate bonded by a ceramic bond consisting of a strong exceedingly fine crystalline material which is due to the action of topaz on the mixture.

11. The method of making refractory concrete which comprises heating concrete resulting from a mix comprising calcium aluminate cement from 5 to 60% by weight of the mix and subjecting it to contact with the volatile materials given off by the heating of topaz at a temperature of at least 1600° F.

12. A method of making refractory concrete which comprises forming a mix comprising calcium aluminate cement from 5 to 60% by weight of the mix and refractory aggregate up to 94.5% by weight of the mix, developing a hydraulic bond in the resulting concrete body, installing such body for service, and in the initial firing of the body subjecting it to contact with the volatile materials given off by topaz when heated to at least 1600° F.

13. The method of treating a refractory concrete body after it has been subjected to temperatures of at least 1400° F. for an appreciable length of time, said concrete body having been formed from a mix comprising calcium aluminate cement from 5 to 60% by weight of the mix and refractory aggregate up to 94.5% by weight of the mix, which comprises heating said body and subjecting it to contact with the volatile material given off by topaz when heated to at least 1400° F.

14. The method of making refractory concrete bodies which comprises forming a mix comprising calcium aluminate cement from 5 to 60% by weight of the mix, topaz containing at least 1% by weight of fluorine from .5 to 95% by weight of the mix, and refractory aggregate up to 94.5% by weight of the mix, forming a body from such mix, developing the hydraulic strength of said body to at least a substantial part of the total hydraulic strength which is possible for said body to attain, and then firing at least one portion of said body at a temperature of at least 1600° F., whereby at least a portion of the volatile material of the topaz is released, resulting in the development in the fired portion of said body of a strong refractory fine grained ceramic bond.

15. The method of making refractory concrete bodies which comprises forming a mix comprising calcium aluminate cement from 5 to 60% by weight of the mix, topaz containing at least 1% by weight of fluorine from .5 to 95% by weight of the mix, and refractory aggregate up to 94.5% by weight of the mix, forming a body from such mix, developing the hydraulic strength of said body to at least a substantial part of the total hydraulic strength which is possible for said body to attain, and then firing at least one portion of said body at a temperature of at least 2000° F., whereby at least a portion of the volatile material of the topaz is released resulting in the development in the fired portion of said body of a strong refractory fine grained ceramic bond.

DANIEL W. KOCHER.

REFERENCES CITED

The following references are of record in the file of this patent:

UNITED STATES PATENTS

| Number | Name | Date |
|---|---|---|
| 1,156,018 | Newberry | Oct. 5, 1915 |
| 2,331,232 | Ross | Oct. 5, 1943 |
| 2,347,968 | Ross | May 2, 1944 |

FOREIGN PATENTS

| Number | Country | Date |
|---|---|---|
| 152,459 | German | 1904 |